United States Patent [19]
Opfer et al.

[11] Patent Number: 5,984,624
[45] Date of Patent: Nov. 16, 1999

[54] ARTICLE LOADER/UNLOADER

[75] Inventors: Mark H. Opfer, Pemberville; Charles E. Gottschalk, Whitehouse; Mark R. Kolkemeyer, Woodville, all of Ohio

[73] Assignee: Glassline Corporation, Perrysburg, Ohio

[21] Appl. No.: 09/253,232

[22] Filed: Feb. 19, 1999

[51] Int. Cl.⁶ .................................................. B65G 49/06
[52] U.S. Cl. ...................... 414/798.5; 414/736; 414/737; 414/798.9; 414/801
[58] Field of Search ..................................... 414/730, 732, 414/736, 737, 738, 743, 798.5, 798.6, 798.9, 801, 802

[56] References Cited

U.S. PATENT DOCUMENTS

| | | | |
|---|---|---|---|
| 4,093,083 | 6/1978 | Klaus ..................................... | 414/798.5 |
| 4,750,854 | 6/1988 | Pascale et al. ......................... | 414/798.5 |
| 4,778,506 | 10/1988 | Peticollin et al. . | |
| 4,846,625 | 7/1989 | Gabillet ............................. | 414/798.5 X |
| 4,863,340 | 9/1989 | Masunaga et al. ............... | 414/798.5 X |
| 5,525,024 | 6/1996 | Freerks et al. . | |
| 5,582,287 | 12/1996 | Heit et al. . | |
| 5,582,400 | 12/1996 | Seydel . | |
| 5,611,193 | 3/1997 | Farrelly . | |
| 5,669,603 | 9/1997 | Detmers et al. . | |
| 5,765,337 | 6/1998 | Lodewegen et al. . | |

*Primary Examiner*—Janice L. Krizek
*Attorney, Agent, or Firm*—Emch, Schaffer, Schaub & Porcello Co., L.P.A.

[57] ABSTRACT

The high speed rack loader/unloader system uses a two arm loading machine to allow flat pieces of material to be loaded on a horizontal conveyor from a vertical rack or to a vertical rack from a horizontal conveyor. The two arms are mounted on a single input, two output right angle gearbox. The outputs of the gearbox rotate in opposite directions so one arm is rotating up while the other arm is rotating down. The two arms are mounted at a roughly 90 degree angle from each other so one arm is at the conveyor while the other arm is at the rack. Each arm has a mechanism to allow the length of the arms to be positioned to four different lengths. Full extension, long extension, short extension and no extension. At the end of the arms are vacuum cups to hold the flat material during transfer. The rack is loaded on a moveable platform that indexes as pieces of material are added or removed.

17 Claims, 3 Drawing Sheets

ARTICLE LOADER/UNLOADER

TECHNICAL FIELD

This invention relates to a process and apparatus for loading/unloading articles such as glass sheets.

BACKGROUND ART

Arrangements for loading and unloading articles such as glass sheets between conveyor systems typically are expensive and complex. Generally, an overhead transport arrangement is employed to transfer the articles between the unloading and loading stations. For example, a mechanical gripper engages one or more articles at the unloading station; transports same in a first direction, typically upward, to clear the conveyor, or other mechanisms. The overhead transport then delivers the articles by horizontal travel to a location over the loading station, and transport the articles in a second direction, typically downward, into another conveyor at the loading station. Significant overhead structure sufficient to span both stations, is required in this conventional arrangement.

In other bending, cutting or grinding operations for glass panes, the panes are transferred from a horizontal conveyor with a transfer device that shifts the panes vertically, seizing them on the intake conveyor, lifting them, then releasing and/or bringing them down anew, and laying them on a form which meanwhile was installed beneath the transfer device.

These transfer devices exhibit the inconvenience of adding to a gravity effect. The added effect intervenes with the transfer of the glass pane. An inertia effect takes place because of the difficulty in transferring the glass pane by placing it delicately without making it fall.

DISCLOSURE OF INVENTION

We have developed an apparatus for loading/unloading articles such as glass panes without the expense, complexity breakage and alignment problems of the prior art. The unloader rotates back and forth between a horizontal and vertical position. The unloader uses two arms, each arm having a compound, transitional motion. The apparatus comprises a high speed rack loader/unloader system that uses a two arm loading machine to allow flat pieces of material to be loaded on a horizontal conveyor from a vertical rack or to a vertical rack from a horizontal conveyor. The two arms are mounted on a single input, two-output right angle gearbox. The outputs of the gearbox rotate in opposite directions so one arm is rotating up while the other arm is rotating down. The two arms are mounted at a roughly a 90 degree angle from each other so one arm is at the conveyor while the other arm is at the rack. Each arm has mechanism to allow the length of the arms to be positioned to four different lengths. The positions are full extend, long extend, short extend and no extension. At the end of the arms are vacuum cups to hold the flat material during transfer. The rack is loaded on a moveable platform that indexes as pieces of material are added or removed.

As a result, this apparatus provides a high speed loading arrangement which does not have expensive and complex overhead transport. The glass panes are not dropped downwardly, nor are they in free flight to land on a receiving truck. The panes are simply and accurately removed from a conveyor and stacked on a conventional rack or pallet. In a preferred embodiment, the partially, loaded rack moves backwardly after it receives a glass pane. This feature further adds to the simplicity of the unloading station as a fixed set of stops and sensors operate between the unloader and rack.

BEST MODE OF CARRYING OUT INVENTION

Figure 1:
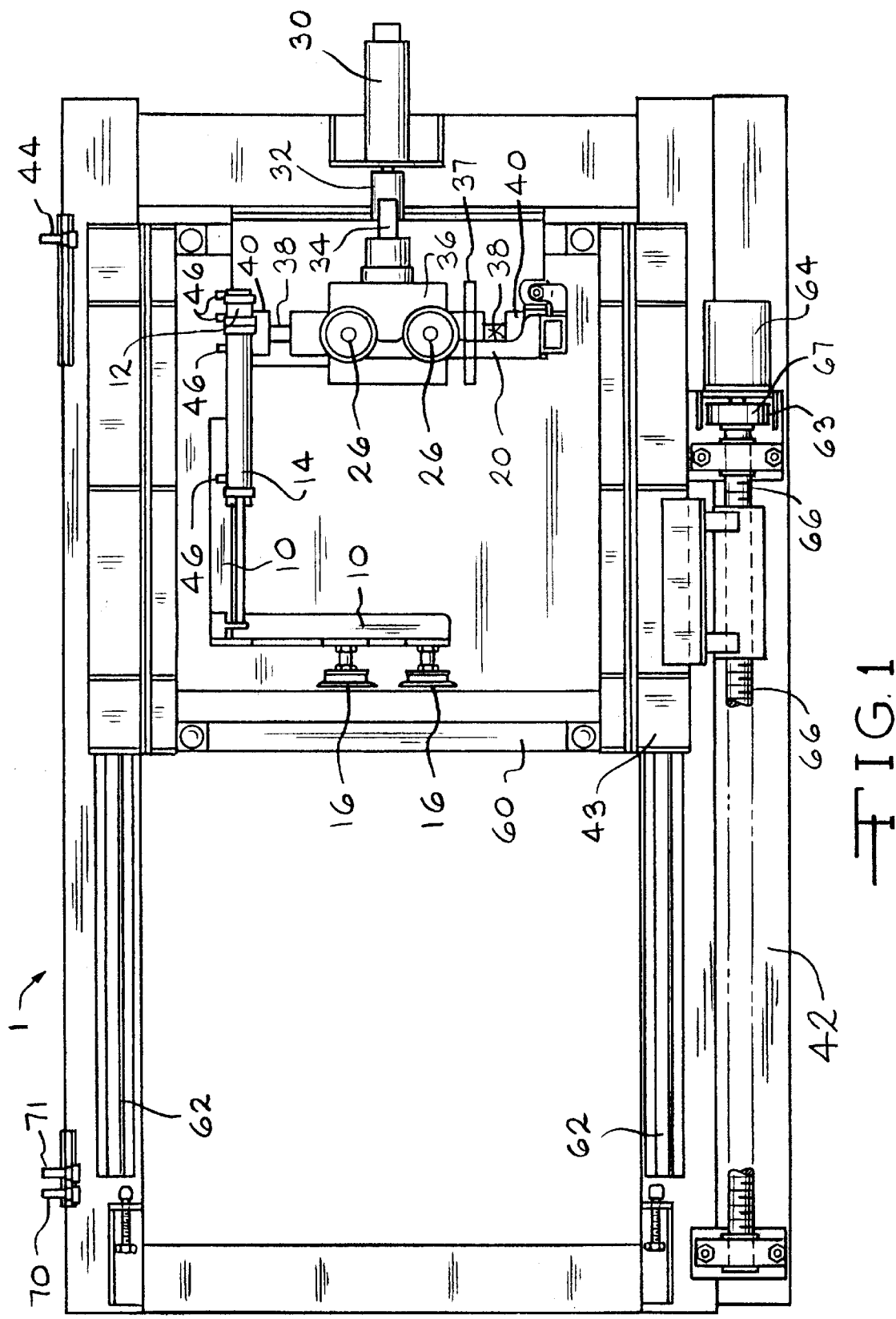
FIG. 1 is a top plan view showing the loader/unloader apparatus of this invention.

The sequence of operation for moving parts from the conveyor to the rack is as follows. 1. The loader/unloader is turned on and the arms are positioned so arm 1 is vertical at the conveyor in full retract mode and arm 2 is at the rack in full retract mode. 2. The part activates a sensor to indicate that the part is in position on the conveyor. 3. Arm 1 vacuum turns on and extends to short extend mode. 4. When the arm 1 vacuum is made, the arm 1 rotates down with a part. 5. When arm 1 is down far enough to clear the conveyor, arm 1 extends to the long extension position. 6. The control makes sure arm 1 is clear of arm 2 using position sensors and continues to rotate to the rack position. 7. At this point, arm 1 is at the rack and arm 2 is at the conveyor, arm 1 is then sent to the full extend position. 8. The control checks the position sensors for arm 1 fully extended. If arm 1 is fully extended, the rack is moved towards the conveyor until arm 1 is not fully extended. If arm 1 is not fully extended, the rack moves away from the conveyor until arm 1 is fully extended. 9. Arm 1 vacuum is turned off placing the part on the rack. 10. When the arm vacuum detection sensor is off, arm 1 retracts to the no extension position. While arm 1 is on steps 7 through 9, arm 2 performs steps 1 through 3. When step 9 is ready on one arm and step 3 is ready on the other arm, steps 4 through 6 are done to swap the arm positions. This process repeats until the rack is full.

The sequence or operation for moving parts from the rack to the conveyor is as follows. 1. Arm 1 is rotated to the rack position. Arm 2 is at the conveyor. 2. Arm 1 is sent to the full extend position. The vacuum for arm 1 is turned on. 3. The control checks the position sensors for arm 1 fully extended. If arm 1 is fully extended, the rack is moved towards the conveyor until arm 1 is not fully extended or the vacuum is detected. 4. If arm 1 is not fully extended, the control waits for vacuum to be detected. When vacuum is detected, arm 1 retracts with a part to the long extension position. 5. The control makes sure arm 1 is clear of arm 2 and rotates arm 1 up to a position near the conveyor. 6. Once arm 1 is up past arm 2, the control retracts arm 1 to the short extend position. 7. When arm 1 is in the short extend position, the control continues to rotate to the conveyor position. 8. When arm 1 reaches the conveyor position, the control waits for the conveyor to be clear of parts. When the conveyor is clear, the control turns off the arm 1 vacuum. 9. When the control detects that the vacuum is off, arm 1 is retracted to the full retracted position. Typically, any form of glass presence switch such as a contact switch, lets the control know when the parts are clear. The conveyor carries the part away from the loader. While arm 1 is on steps 8 and 9, arm 2 is performing steps 1 through 4. When step 9 is ready on one arm and step 4 is ready on the other arm, steps 5 and 6 are done to swap the arm positions. This process repeats until the rack is empty.

Figure 2:
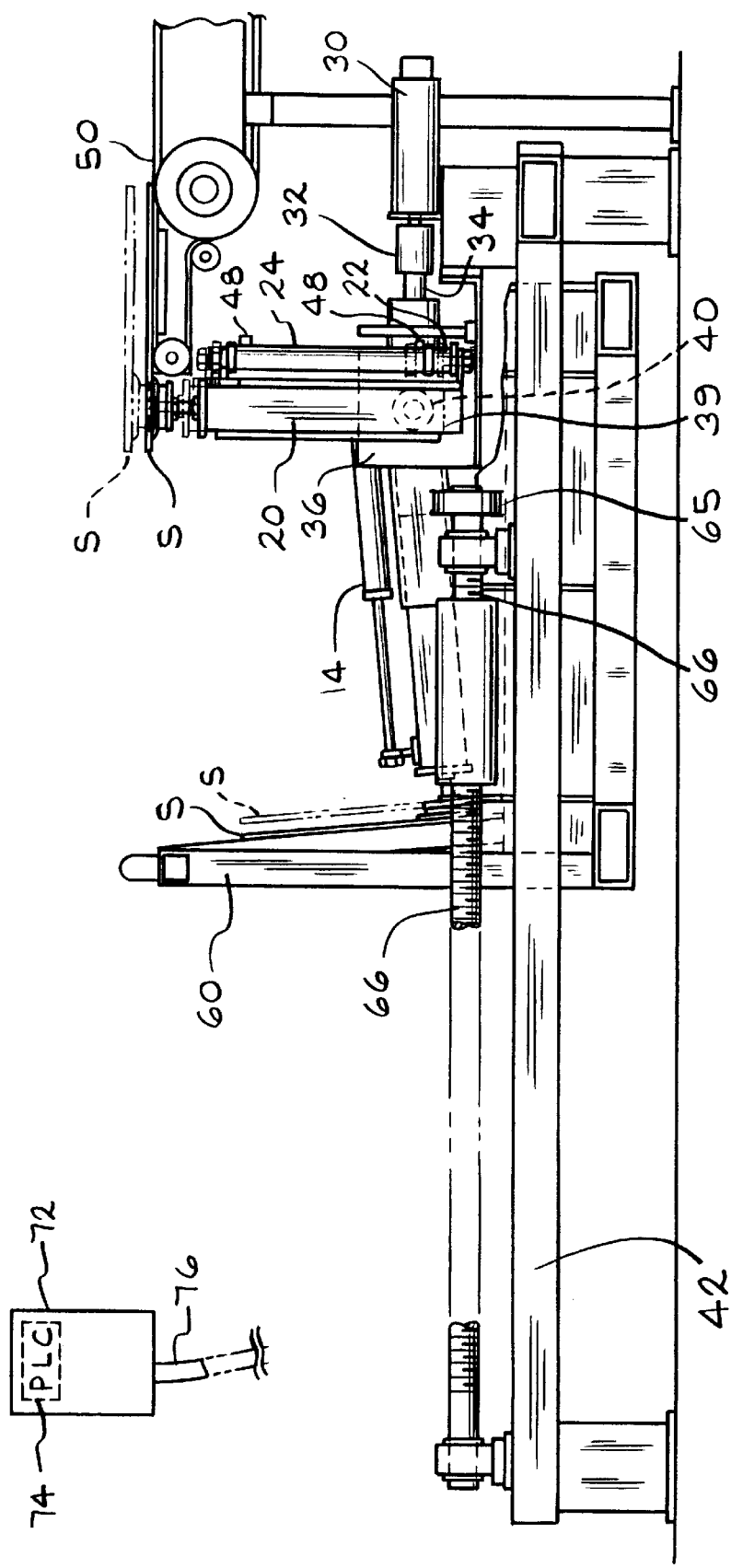
FIG. 2 is a side plan view of FIG. 1.

Turning now to the drawings, FIGS. 1 and 2 shows high speed loader/unloader 1, including arm 10 and arm 20. Each of arms 10 and 20 is a one piece right angle bracket. Arm 10 is connected to pneumatic cylinder 12 and pneumatic cylinder 14. Suction cups 16 are connected to arm 10. In the same manner, arm 20 is connected to pneumatic cylinders 22 and 24. Suction cups 26 are connected to arm 20.

Servo motor 30 connects to the four pneumatic cylinders through shaft coupling 32 and input shaft 34. Input shaft 34 connects to right angle gear box 36 which connects to output rotary drive shafts 38 which connect through arm 39 of the pneumatic cylinders through bushings 40. Sensor 37 includes reference sensors and end of travel sensors.

Frame 42 and its rails provide a structure for supporting the loader/unloader of this invention. Frame 42 includes end of travel sensor 44 as a position sensor for locating the position of rack 60. Also, position sensor 46 is located on cylinder 14 and position sensor 48 is located on cylinder 24.

Conveyor 50 is shown delivering glass pane S. Conveyor 50 may be any conveyor for providing sheets or glass panes S to the loader/unloader of this invention.

Frame 42 also supports rack 60 on guide rails 62. This is accomplished by movable platform 43 moving on guide rails 62. Platform 43 then supports rack 60. Servo motor 64 drives rack 60 through lead screw 66. End of travel position sensor 70 and reference sensor 71 detect the position of platform 43. FIGS. 1 and 2 show arm 20 with no extension and arm 10 fully extended.

FIG. 2 also shows control panel 72 which includes programmable controller, PLC 74. Energy chain 76 connects to the various motors, sensors and other components through conventional circuitry and wiring (not shown).

Figure 3:
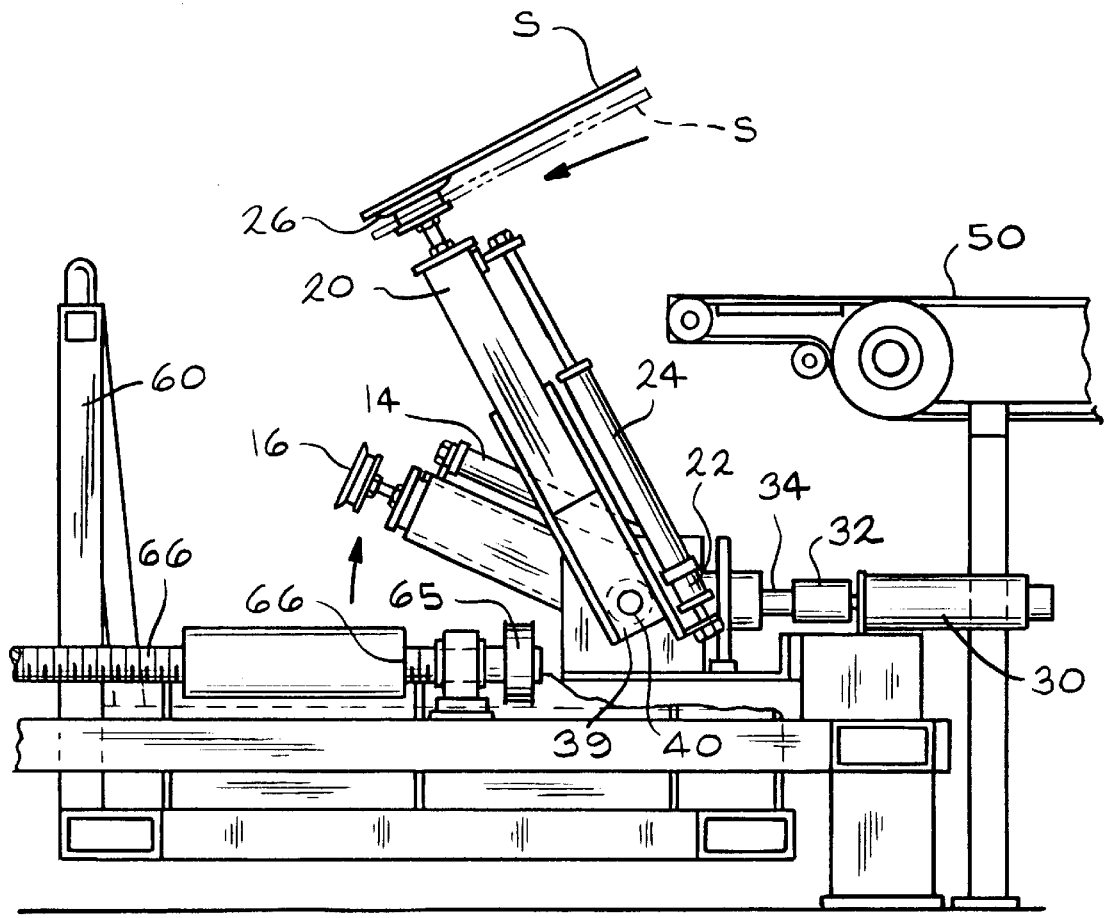
FIG. 3 shows the rotary arms of the unloader in motion.

FIG. 3 shows arm 10 in no extension and arm 20 in long extension. FIG. 3 also shows arm 10 rotating upwardly and arm 20 rotating downwardly.

FIGS. 2 and 3 also show servo motor and lead screw 66 in more detail. Belt 63 connects motor 64 to lead screw 66. Belt 63 connects thereto via upper belt pulley 65 and lower belt pulley 67.

In addition to the embodiments discussed above, it will be clear to persons skilled in the art that numerous modifications and changes can be made to the above invention without departing from its intended spirit and scope.

We claim:

1. An apparatus for loading articles, the apparatus comprising:
    a horizontal conveyor for supplying a plurality of the articles to be unloaded therefrom, the plurality of articles being conveyed along the conveyor to an unloading station;
    the unloading station including two arms mounted on a single input, two output right angle gearbox, wherein the outputs of the gearbox rotate in opposite directions with one arm being rotated upwardly with the other arm being rotated downwardly;
    each arm having a mechanism to allow the length of the arm to be positioned to four different lengths: full extension, long extension, short extension and no extension;
    a gripper attached to a distal end of each arm;
    a rack for receiving and accumulating the articles to be unloaded from the conveyor;
    the rack located on a moveable platform that indexes when the rack receives an article; and
    a controller that includes a program that positions one arm vertically at the conveyor with no extension and the other arm horizontally at the rack with no extension when the apparatus is not in operation.

2. An apparatus according to claim 1 wherein the controller's program sequentially positions one arm vertically at the conveyor with no extension, extends the one arm to short extension and grips an article, rotates the one arm downwardly away from the conveyor, extends the one arm to long extension, rotates the one arm to a horizontal position at the rack, extends the one arm to full extension, releases the grip on the article, and retracts the one arm to no extension.

3. An apparatus according to claim 2 wherein the controller's program additionally rotates the horizontal one arm with no extension at the rack to one arm with no extension vertically at the conveyor.

4. An apparatus according to claim 1 wherein the controller's program sequentially positions one arm horizontally at the rack, extends the one arm to full extension and releases the grip on the article, retracts the one arm to no extension, and wherein simultaneously the controller's program sequentially positions the other arm vertically at the conveyor with no extension, extends the other arm to short extension and grips the article.

5. An apparatus according to claim 4 wherein the controller's program sequentially rotates the other arm downwardly away from the conveyor, extends the other arm to long extension and rotates the other arm to a horizontal position at the rack, wherein simultaneously the controller's program sequentially rotates the horizontal one arm with no extension at the rack to one arm with no extension at the conveyor.

6. An apparatus according to claim 1 wherein the arms are pneumatic cylinders with position sensors for detecting the extension of the arms, wherein the position sensors are connected to and send signals to the controller.

7. An apparatus according to claim 1 wherein the gripper is at least one vacuum cup connected to a vacuum source, the vacuum cup also including vacuum sensors connected to and sending signals to the controller.

8. A process for loading articles comprising the steps of:
    supplying a plurality of the articles to be loaded;
    conveying the articles on a horizontal conveyor to an unloading station;
    providing a first arm in a vertical position at the unloading station of the conveyor;
    providing a rack for receiving and accumulating the articles to be unloaded from the conveyor;
    providing a second arm in a horizontal position at the rack;
    providing each arm with a mechanism to allow the length of the arm to be positioned to four different lengths: full extension, long extension, short extension and no extension;
    providing each arm with a gripper located at an end of each arm adjacent the unloading station of the conveyor or adjacent the rack; and
    positioning the first arm vertically at the conveyor with no extension and the second arm horizontally at the rack with no extension.

9. A process according to claim 8 including the steps of:
    extending the first arm to short extension;
    gripping an article at the unloading station of the conveyor with the gripper of the first arm;
    rotating the first arm and the gripped article downwardly to a position clear of the conveyor;
    extending the first arm to long extension;
    continue rotating the first arm downwardly to a horizontal position at the rack;
    extending the first arm to full extension; and
    depositing the article on the rack by releasing the grip thereon.

10. A process according to claim 9 including the simultaneous steps of:

rotating the second arm upwardly with no extension;

assuring that the second arm is clear of the first arm; and continue rotating the second arm upwardly to a vertical position at the unloading station of the conveyor with no extension.

11. A process according to claim 9 including the simultaneous step of:

moving the rack in a horizontal direction towards or away from the first arm in full extension to place the rack adjacent the article being gripped.

12. A process according to claim 10 wherein the steps are repeated until the rack is filled with the articles to be loaded.

13. A process for unloading articles comprising the steps of:

providing a rack holding a plurality of the articles to be unloaded;

providing a first arm in a horizontal position at the rack;

providing a conveyor for receiving and accumulating the articles to be unloaded from the rack;

providing a second arm in a vertical position at the conveyor;

providing each arm with a mechanism to allow the length of the arm to be positioned to four different lengths: full extension, long extension, short extension and no extension;

providing each arm with a gripper located at an end of each arm adjacent the conveyor or adjacent the rack; and positioning the first arm horizontally at the rack with long extension and the second arm vertically at the conveyor with no extension.

14. A process according to claim 13 including the steps of:

extending the first arm to full extension;

gripping an article at the rack with the gripper of the first arm;

rotating the first arm and the gripped article upwardly to a position clear of the rack;

retracting the first arm to short extension;

continue rotating the first arm upwardly to a vertical position at the conveyor;

depositing the article on the conveyor;

releasing the grip on the article; and retracting the first arm to no extension.

15. A process according to claim 14 including the simultaneous steps of:

rotating the second arm downwardly with no extension;

assuring that the second arm is clear of the first arm; and continue rotating the second arm downwardly to a horizontal position at the rack with long extension.

16. A process according to claim 15 including the simultaneous step of:

moving the rack in a horizontal direction towards or away from the second arm in full extension to place the rack adjacent the article being gripped.

17. A process according to claim 15 wherein the steps are repeated until the rack is unloaded.

* * * * *